Jan. 24, 1928.
A. M. MORRISON
1,657,173
STRAINER AND CHECK VALVE
Filed Feb. 16, 1927
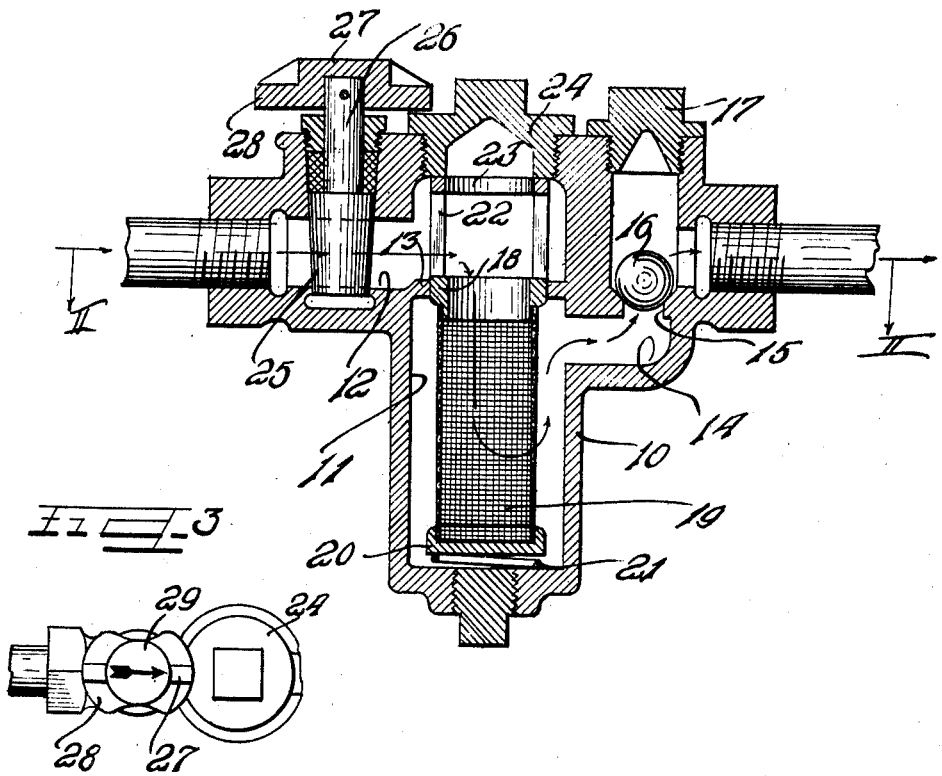
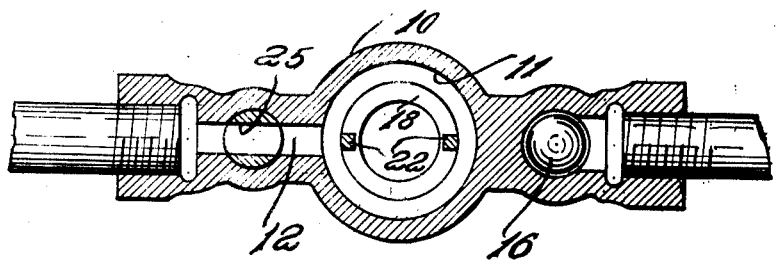
Inventor
Andrew M. Morrison
By Charles F. Kelly
Attys Patented Jan. 24, 1928.

1,657,173

UNITED STATES PATENT OFFICE.

ANDREW M. MORRISON, OF DUBUQUE, IOWA, ASSIGNOR TO MORRISON BROS., OF DUBUQUE, IOWA, A CORPORATION OF IOWA.

STRAINER AND CHECK VALVE.

Application filed February 16, 1927. Serial No. 168,520.

This invention relates to a liquid strainer, with particular reference to fuel strainers for use in the fuel lines of internal combustion engines or oil burners.

It is an object of this invention to provide a fuel strainer having a check valve on one side and a shut off valve or cock on the other side so arranged that the strainer plug cannot be removed for cleaning while the valve or cock is open, thus providing a safety feature in preventing the oil or gasoline from overflowing from either the supply or delivery lines. The advantage of this structure will be evident in the compulsory shut off as well as avoiding the necessity of draining the whole fuel line before opening the strainer.

Other and further important objects of this invention will be apparent from the disclosures in the specification and the accompanying drawings.

This invention (in a preferred form) is illustrated in the drawings and hereinafter more fully described.

On the drawings:

Figure 1 is a central vertical section through a strainer embodying the features of this invention.

Figure 2 is a horizontal section on the line II—II of Figure 1.

Figure 3 is a fragmentary detail showing the cock key and cam.

As shown on the drawings:

A strainer body 10 is provided with a central strainer well 11 with an inlet passage 12 to the top of the well through an apertured partition 13, the outlet passage 14 leading from below this partition up to a ball seat 15 for a ball 16 forming a non-return valve; the ball being inserted by removing a cap 17.

The strainer proper comprises an open cage having a ring 18 fitting the aperture in the partition 13, this ring 18 carrying a cylindrical screen 19 closed at the bottom by a cap 20 bearing on a spring 21. The ring 18 is connected by spacers 22 to an upper ring 23 which contacts a plug 24 which holds the strainer assembly down against the action of the spring 21.

The inlet passage 12 is provided with a passaged cock 25 with an operating stem 26 parallel to and alongside the strainer axis, the stem being operated by a key 27 formed on a double lobed cam 28, the lobes and key ends of which are long enough to project over the strainer cap or plug 24 when the cock is open. The portions 29 of the cam between the lobes is cut back far enough to clear the outer diameter of the plug 24 when the cock is turned to its full shut off position, thus permitting removal of the strainer plug and strainer in this position.

In the operation of cleaning this strainer, it is compulsory to shut off the cock 25 to move the cam 28 so that the clearance spaces 29 permit removal of the strainer plug 24, after which the strainer proper can be lifted out of the well and cleaned. While the strainer is thus opened, the ball check valve prevents back flow of the liquid on the delivery side of the strainer so that overflowing from this cause is prevented.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. In combination, a strainer body having inlet and outlet passages and a strainer compartment, a removable strainer in said compartment, a cap securing said strainer in position, a non-return check valve positioned in said outlet, a shut off cock positioned in said inlet, and an external handle for said cock overlapping the strainer cap when said shut-off cock is open whereby said cap cannot be removed without shutting off said cock.

2. A strainer comprising a hollow body having inlet and outlet connections, an open top strainer element so positioned in said body as to receive the incoming fluid in its open top, a cap adapted to retain said strainer element in position, a shut-off cock in said inlet connection, and an external handle for said cock overlapping the strainer cap when said shut-off cock is open and adapted to swing out of the way to permit removal of the cap when said cock is closed.

3. A strainer comprising a partitioned body having an inlet connection to above the partition and an outlet connection from below the partition, an open top strainer positioned in an aperture in the partition, said strainer having a ring positioned in spaced relationship above the top of the strainer proper, a cap seating in said body and bearing against said ring, and a shut-off cock in said inlet connection having a handle overlapping said cap when said cock is open and adapted to swing out of the way to permit removal of the cap when said cock is closed.

In testimony whereof I have hereunto subscribed my name at Dubuque, Dubuque County, Iowa.

ANDREW M. MORRISON.